US010075780B2

(12) United States Patent
Sannié et al.

(10) Patent No.: US 10,075,780 B2
(45) Date of Patent: Sep. 11, 2018

(54) SUPPORT FOR AUDIO SYSTEM AND AUDIO EQUIPMENT COMPRISING SUCH A SUPPORT

(71) Applicant: DEVIALET, Paris (FR)

(72) Inventors: Quentin Sannié, Paris (FR); Emmanuel Nardin, Vanves (FR); Pierre-Emmanuel Calmel, Le Chesnay (FR); Nicolas Regentête, Paris (FR); Julien Bergère, Versailles (FR)

(73) Assignee: Devialet, Paris (FR)

( * ) Notice: Subject to any disclaimer, the term of this patent is extended or adjusted under 35 U.S.C. 154(b) by 7 days.

(21) Appl. No.: 15/312,052

(22) PCT Filed: Dec. 16, 2014

(86) PCT No.: PCT/EP2014/078025
§ 371 (c)(1),
(2) Date: Nov. 17, 2016

(87) PCT Pub. No.: WO2015/097023
PCT Pub. Date: Jul. 2, 2015

(65) Prior Publication Data

US 2017/0085974 A1 Mar. 23, 2017

(30) Foreign Application Priority Data

Dec. 24, 2013 (FR) ..................................... 13 63570

(51) Int. Cl.
*H04R 1/02* (2006.01)
*F28D 21/00* (2006.01)
(Continued)

(52) U.S. Cl.
CPC ............. *H04R 1/026* (2013.01); *F28D 21/00* (2013.01); *F28D 2021/0029* (2013.01);
(Continued)

(58) Field of Classification Search
CPC ...... H04R 1/026; H04R 9/022; H04R 19/005; H04R 19/04; H04R 1/025;
(Continued)

(56) References Cited

U.S. PATENT DOCUMENTS

2008/0296448 A1 12/2008 Eshita et al.
2013/0272537 A1* 10/2013 Tada ...................... H04R 9/022 381/86

FOREIGN PATENT DOCUMENTS

EP 2654319 A2 10/2013
GB 2187607 A 9/1987
JP 2002341777 A 11/2002

OTHER PUBLICATIONS

PCT International Search Report and PCT Written Opinion of ISA dated Mar. 13, 2015 and PCT IPRP dated Jun. 28, 2016 issued in corresponding PCT International Application No. PCT/EP2015/058304.

(Continued)

*Primary Examiner* — Sunita Joshi
(74) *Attorney, Agent, or Firm* — Troutman Sanders LLP

(57) ABSTRACT

The invention relates to a support for an audio system, the audio system comprising a heat source, a discharge surface for the heat and means for conducting at least one portion of the heat produced by the heat source towards the discharge surface. The support further comprises a plate comprising at least one heat-conducting elastic member able to deform for fitting at least one portion of the discharge surface of the audio system, and a thermal dissipation radiator in thermal contact with the elastic member.

15 Claims, 3 Drawing Sheets

(51) Int. Cl.
*H04R 9/06* (2006.01)
*H04B 1/00* (2006.01)
*H04R 9/02* (2006.01)
*F28F 21/06* (2006.01)
*F28F 13/00* (2006.01)

(52) U.S. Cl.
CPC ....... *F28F 21/067* (2013.01); *F28F 2013/006* (2013.01); *H04R 9/022* (2013.01)

(58) Field of Classification Search
CPC .. H04R 2201/021; H04R 29/00; G28D 21/00; F28D 2021/0029; F28F 21/067; G10K 11/178; G10K 11/1788; G10K 2210/129; G10K 2210/3025; G10K 2210/3211; H04M 1/02; H04M 1/0266; H04M 1/0295; H04M 1/23
USPC .................. 381/189, 86, 361, 333, 386, 388
See application file for complete search history.

(56) References Cited

OTHER PUBLICATIONS

French Search Report dated Sep. 2, 2014 issued in corresponding French Application No. 1453507.

* cited by examiner

SUPPORT FOR AUDIO SYSTEM AND AUDIO EQUIPMENT COMPRISING SUCH A SUPPORT

CROSS-REFERENCE TO RELATED APPLICATIONS

This application is a National Stage of International Application No. PCT/EP2014/078025, filed Dec. 16, 2014. This application, in turn, claims priority to French Patent Application No. 1363570, filed Dec. 24, 2013. Both applications are incorporated herein by reference.

FIELD OF THE INVENTION

The present invention relates to a support for an audio system, the audio system comprising a heat source, a heat discharge surface and means for conducting at least one portion of the heat produced by the heat source towards the discharge surface.

The invention applies to the field of sound reinforcement system.

BACKGROUND

It is understood by "audio system", under the meaning of the present invention, any device of an electro-acoustic chain, such as for example a reader of audio media, an amplifier or an acoustic speaker or a combination thereof.

It is common to arrange such audio systems on a support for elevating them, for example for making an amplifier more accessible to a user, or further for bearing a speaker to a height allowing better listening.

These audio systems comprise a heat source, for example their electronic components when they are powered.

During the operation of an audio system, the source produces heat and the system heat up. Often, such a heat-up is detrimental to the performances of the audio system. For example, the maximum sound volume which may be attained with an acoustic speaker decreases during its operation, because of the heating of its control electronics and of its loudspeakers.

These audio systems sometimes comprise means for conducting at least one portion of the heat produced by the heat source of the system to a heat discharge surface.

However, such means do not give entire satisfaction.

Indeed, for esthetical reasons, the dimensions of the heat discharge surface are generally reduced, which causes insufficient removal of the heat produced, and therefore degraded performances of the audio system.

SUMMARY

An aim of the invention is therefore to propose a support which allows better operation of the audio system while ensuring an elevation function and proposing an esthetical equipment.

For this purpose, the object of the invention is a support of the aforementioned type, comprising a plate comprising at least one elastic heat conducting member able to deform in order to at least fit one portion of the discharge surface of the audio system and a thermal dissipation radiator in thermal contact with the elastic member.

Indeed, as the support is able to receive a portion of the heat produced by the heat source, the audio system heats up less, which allows better operation than in the case when the support is absent. Further, the support always ensures an elevation function.

According to other advantageous aspects of the invention, the support comprises one or several of the following features, taken individually or according to any technically possible combination:

- said or each elastic member is at least partly made in elastomer;
- said or each elastic member has a thermal conductivity greater than or equal to 1 W/m/K at 20° C., preferably greater than or equal to 3 W/m/K at 20° C.;
- the radiator comprises fins;
- the plate is movable with respect to the radiator in rotation around at least one axis;
- the support comprises a hooking-up device intended to cooperate with a complementary hooking-up device of the audio system for securing the audio system to the support;
- the support delimits at least one channel, the channel opening through a first end in proximity to the or an elastic member and through a second end, opposite to the first end, at a distance from the elastic member for allowing outdoor air to be brought towards the exchange surface;
- the support comprises a fan capable of forcing circulation of air in the channel;
- the support comprises at least one connection cable positioned in the channel and comprising at least one connector.

Further, the object of the invention is an audio equipment characterized in that it comprises an audio system comprising a heat source, a heat discharge surface and means for conducting at least one portion of the heat produced by the heat source towards the discharge surface, the audio equipment being characterized in that it further comprises a support as defined above, at least one portion of said or each elastic member of the plate being in thermal contact with at least one portion of the discharge surface of the audio system.

According to other advantageous aspects of the invention, the audio equipment comprises one or several of the following features, taken individually or according to any technically possible combination:

- the elastic member and the discharge surface form a thermal contact having a thermal resistance advantageously less than 5 K/W, preferably less than 3 K/W, for example less than 1 K/W;
- the plate and the radiator of the support have together a calorific capacity at least equal to half the sum of the calorific capacity of the discharge surface and of the calorific capacity of the means for conducting at least one portion of the heat produced by the heat source towards the discharge surface.

BRIEF DESCRIPTION OF THE DRAWINGS

The invention will be better understood by means of the description which follows, exclusively given as a non-limiting example and made with reference to the appended drawings wherein.

DETAILED DESCRIPTION

Figure 1:
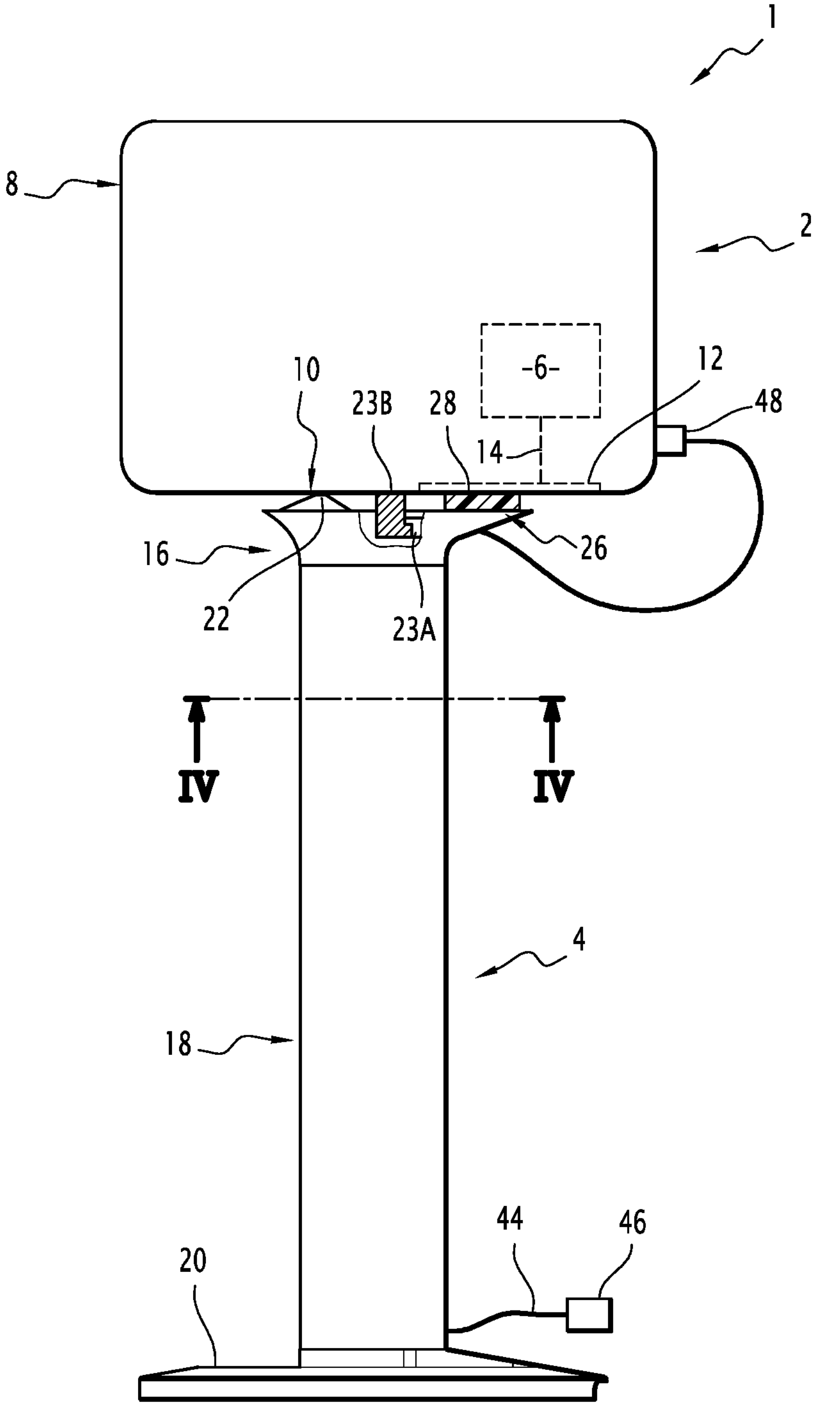
FIG. 1 is a schematic illustration seen from the side of an audio equipment according to the invention, comprising a support receiving an audio system.

An audio installation 1 according to the invention is illustrated in FIG. 1. The audio equipment 1 comprises an audio system 2 and a support 4.

The audio system 2 is for example an amplifier and one or several loudspeakers integrated into a casing 5.

The audio system 2 is supported by the support 4.

The audio system 2 comprises a heat source 6.

The heat source 6 is for example an electronic board or a loudspeaker.

The casing 5 of the audio system 2 comprises a bottom 10 defining a heat discharge surface 12.

The audio system 2 also comprises a thermal bridge 14 adapted for conducting at least one portion of the heat produced by the heat source 6 towards the heat discharge surface 12.

The support 4 comprises a plate 16, a leg 18 forming a thermal radiator and a base 20.

The plate 16 and the base 20 each extend in a plane substantially horizontal and parallel to the plane IV-IV.

The leg 18 extends along a longitudinal axis X-X substantially vertical and orthogonal to the plane IV-IV.

The leg 18 is positioned between the plate 16 and the base 20. The leg 18 is secured to the plate 16 and to the base 20.

The plate 16 and the leg 18 are in thermal contact.

For example, lamellas of the plate 16 are plugged into corresponding housings of the leg 18 in order to produce a thermal contact.

The thermal resistance of the thermal contact between the plate 16 and the leg 18 is advantageously less than or equal to 5 K/W.

Preferably, the plate 16 and the leg 18 each have a thermal conductivity greater than 1 W/m/K at 20° C., for example greater than 5 W/m/K at 20° C.

Advantageously, the plate 16 and the leg 18 are at least partly made in metal, for example in steel or aluminium.

The plate 16 and the leg 18 are made separately and assembled for producing a thermal contact between them.

The plate 16 and the leg 18 have together a calorific capacity at least equal to half of the sum of the calorific capacity of the discharge surface 12 and of the calorific capacity of the thermal bridge 14.

Alternatively, the plate 16 and the leg 18 are molded in one single piece.

The base 20 is adapted so as to be positioned on a horizontal planar surface, for example a ground, and supporting the assembly formed by the plate 16 and the leg 18.

The plate 16 comprises an upper face 22 for receiving the bottom 10 of the audio system 2, as illustrated by FIG. 1.

Preferably, the plate 16 comprises a hooking-up device 23A, as illustrated by FIG. 1. The hooking-up device 23A is able to cooperate with a complementary hooking-up device 23B of the audio system, for securing the audio system 2 to the support 4, as illustrated by FIG. 1.

Figure 3:
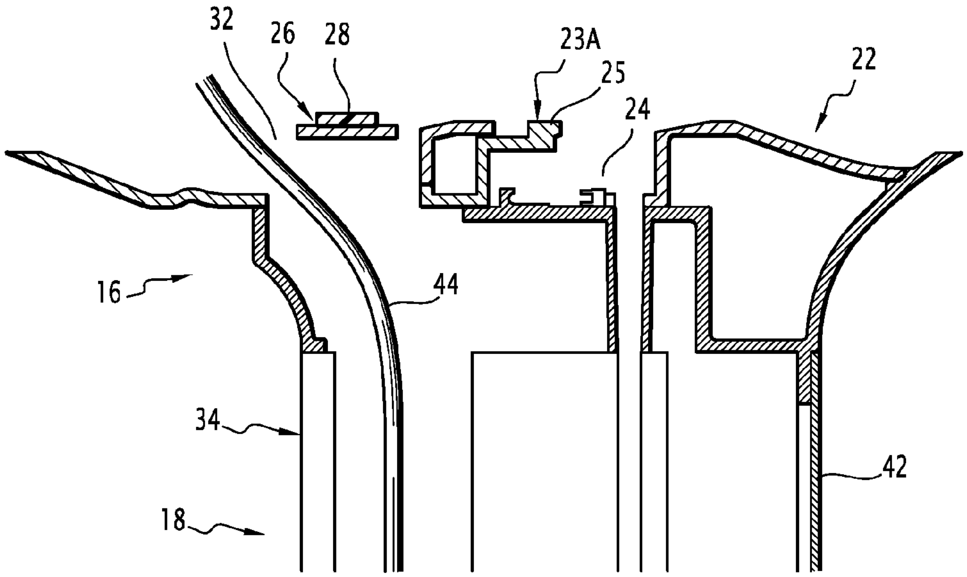
FIG. 3 is a detail of a sectional view along the plane III-III of the equipment illustrated in FIG. 2.

With reference to FIG. 3, the hooking-up device 23A of the plate 16 comprises a cavity 24 adapted for receiving a protrusion (not shown) of the audio system 2. The hooking-up device 23A also comprises an abutment 25 adapted for cooperating with the protrusion and blocking it.

Preferably, the abutment is movable in order to allow a user to release the protrusion of the audio system 2 and to detach the audio system 2 from the support 4.

Figure 2:
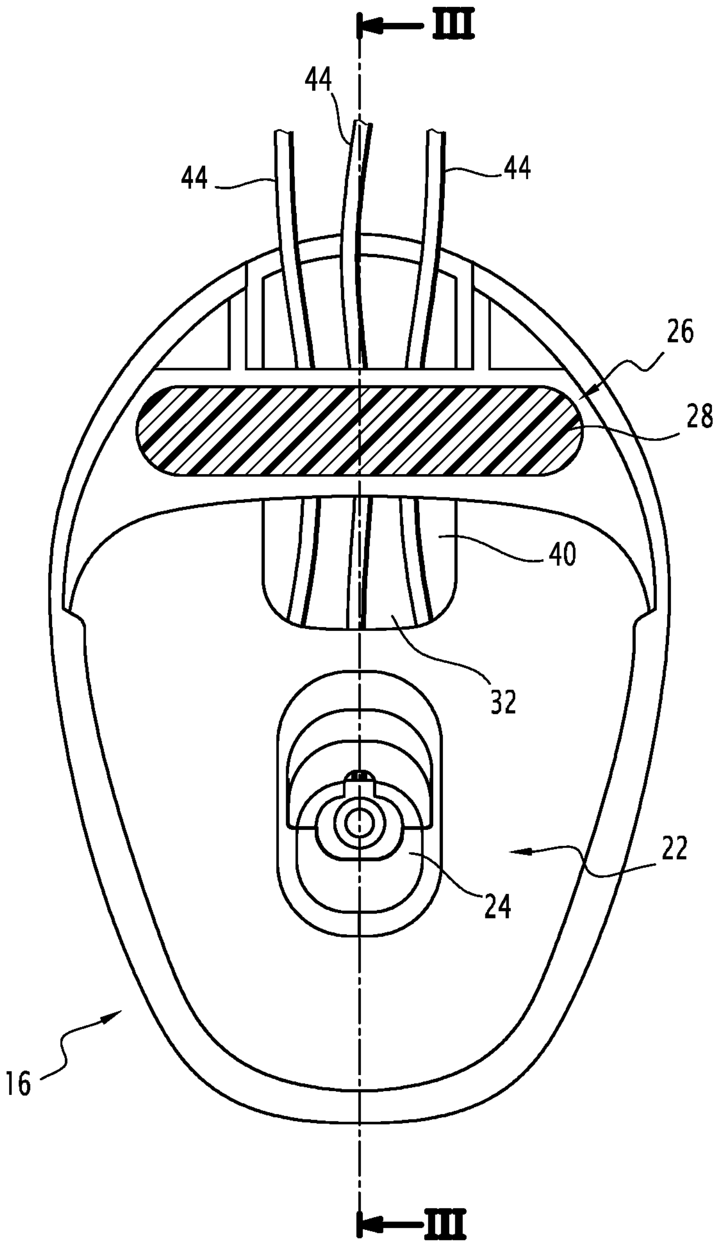
FIG. 2 is a detail of a top view of a plate of the equipment illustrated in FIG. 1.

As this appears in FIGS. 1 and 2, the plate 16 also comprises a pad 26, for which one free heat exchange surface 28 is in thermal contact with a portion of the discharge surface 12 of the audio system 2.

The pad 26 is elastic and is able to deform so that its exchange surface area 28 fits at least one portion of the discharge surface 12 of the audio system 2 in order to produce a thermal contact with the discharge surface 12.

The pad 26 is made at least partly in elastomer with a metal load. Further, the pad 26 has a heat conductivity greater than or equal to 1 W/m/K at 20° C., preferably greater than or equal to 3 W/m/K at 20° C.

Such an elastomer is for example Gap Pad produced by The Bergquist Company.

For example, the pad 26 is at least partly made in Gap Pad with a heat conductivity substantially equal to 3 W/m/K.

The thermal resistance of the thermal contact between the pad 26 and the discharge surface 12 is advantageously less than 5 K/W, preferably less than 3 K/W, for example less than 1 K/W.

Alternatively, the plate 16 comprises a plurality of pads 26.

The plate 16 also defines an orifice 32 in proximity to the exchange surface 28.

The leg 18 is substantially cylindrical and comprises a lateral surface 34.

Figure 4:
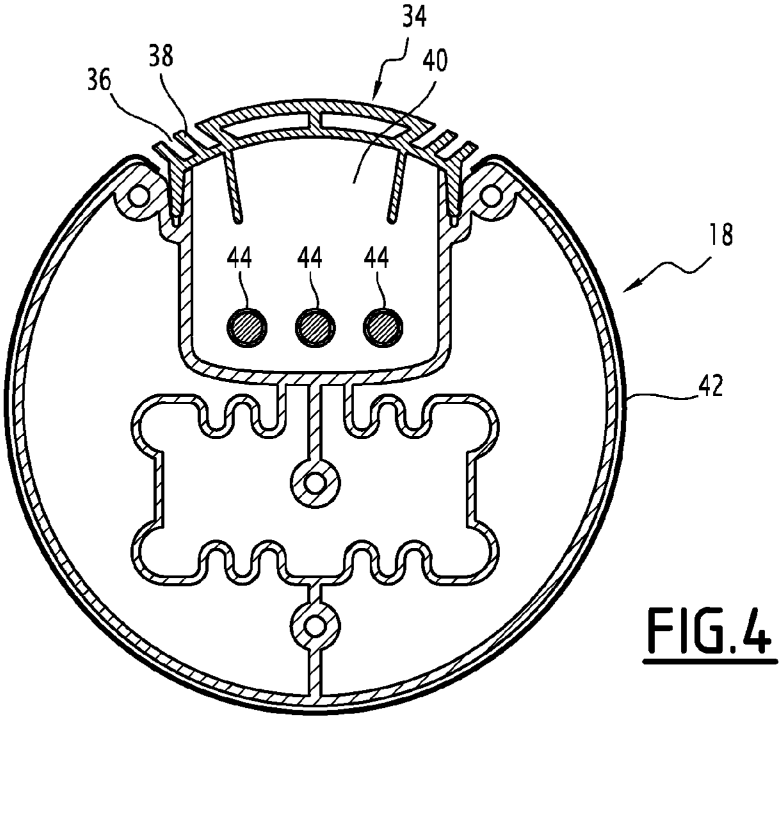
FIG. 4 is a detail of a sectional view along the plane IV-IV of the equipment illustrated in FIG. 1.

As this appears in FIG. 4, the lateral surface 34 of the leg 18 comprises grooves 36 extending along the longitudinal axis X-X. The grooves 36 define fins 38.

The leg 18 delimits a channel 40. The channel 40 extends along the longitudinal axis X-X.

The channel 40 opens at a first end by the orifice 32. Further, the channel 40 opens at a second end, opposite to the first end, at a distance from the exchange surface 28.

The channel 40 is such that the outdoor air relatively to the support 4 may penetrate therein, circulate therein and flow out of the latter.

Alternatively, the plate 16 does not comprise any orifice and the channel 40 opens at the first end in proximity to the exchange surface 28.

The leg 18 also comprises a fan (not shown). The fan is able to force circulation of air in the channel 40 from one end to an opposite end.

A portion of the lateral surface 34 of the intermediate body 18 is covered by a peripheral cover 42. The peripheral cover 42 is for example a cover or a varnish.

Preferably, the peripheral cover 42 does not cover the portion of the lateral surface 34 comprising the fins 38.

A plurality of cables 44 are positioned in the channel 40. Each cable 44 is for example a power supply cable, a cable able to convey an electric signal, or an optical fibre.

For each cable 44, one of its ends emerges from the channel 40 through the orifice 32. The other end of the cable 44 emerges through the second end of the channel 40.

Each cable 44 comprises a distal connector 46. The distal connector 46 is adapted for being connected to a corresponding connector of a current or light source.

Each cable 44 further comprises a proximal connector 48. The proximal connector 48 is adapted so as to be connected to a corresponding connector of the audio system 2.

According to another embodiment (not shown) of a support according to the invention, the plate 16 is jointed with a hinge relatively to the leg 18. Preferably, the plate 16 is movable relatively to the foot 18 around the longitudinal axis X-X. Preferably, the plate 16 is also movable relatively to the leg 18 around a transverse axis which is orthogonal to the longitudinal axis X-X.

Advantageously, the support comprises specific locking means for preventing the displacement of the plate 16 relatively to the leg 18 after a user has placed the plate 16 in a desired orientation.

For example, the plate 16 and the leg 18 are in a relationship via a spherical connection. The transverse axis and the longitudinal axis X-X then converge to the centre of the spherical connection.

Advantageously, the support comprises a flexible metal layer connecting the pad 26 and the leg 18 for putting them in thermal contact. Preferably, the thermal resistance of the thermal contact between the plate 16 and the leg 18 is advantageously less than 5 K/W, preferably less than 3 K/W, for example less than 1 K/W.

Alternatively, the leg 18 is replaced with a bracket giving the possibility of attaching the support 4 to a substantially vertical surface, for example a wall.

According to an alternative not shown of an audio equipment according to the invention, the discharge surface 12 of the audio system 2 is located in a cavity of the audio system 2, the cavity opening onto the external surface 5 of the audio system 2 through a discharge aperture. The plate 16 comprises a finger adapted for engaging into the discharge aperture in order to establish a thermal contact with the discharge surface 12, and for achieving a mechanical hooking-up with the audio system 2. For example, the finger comprises a pad 26 as described above.

The operation of the audio equipment 1 will now be described.

The audio system 2 is placed on the support 4.

The heat source 6 produces heat. The thermal bridge 14 conveys a portion of the heat produced by the heat source 6 towards the discharge surface 12.

The exchange surface 28 of the plate 16 is in thermal contact with the discharge surface 12 of the audio system. Notably, the pads 26 are deformed so that their exchange surface 28, fits at least one portion of the discharge surface 12 of the audio system 10.

The plate 16 receives, via the exchange surface 28, received heat equal to a portion of the heat produced by the source 6 and available at the discharge surface 12.

A portion of the heat received by the plate 16 is conveyed by conduction towards the leg 18 as a heat to be removed.

A portion of the heat to be removed is dissipated in the air by radiation and by free convection, notably at the interface between the fins 38 and the ambient air.

Further, the fan causes circulation of air in the channel 40, which leads to dissipation by forced convection in the channel 40 of a portion of the heat to be removed received by the leg 18.

As the orifice 32 is located in proximity to the exchange surface 28, it is therefore located in proximity to the discharge surface 12. Thus, the air driven into the channel 40 allows dissipation by forced convection, directly at the discharge surface 12, of a portion of the heat emitted by the heat source 6.

As the support 4 is able to receive one portion of the heat produced by the heat source 6, the audio system 2 heats up less, its operation is better than in the absence of the support 4.

The optional presence of deformable pads 26 gives the possibility of increasing the surface area of the mechanical contact between the exchange surface area 28 of the plate 16 and the discharge surface area 12 of the audio system 2, as compared with the case when these pads are inexistent. This has the effect of improving the thermal contact between the exchange surface 28 and the discharge surface 12.

Further, the optional presence of fins 38 gives the support 4 a large thermal exchange surface with ambient air, which facilitates dissipation of the heat received by the support 4.

The optional mobility of the plate 16 in rotation relatively to the leg 18, allows a user to orient the audio system for more comfortable use, notably in the case when the support 4 is attached to a vertical surface, for example a wall.

Further, the optional presence in the support 4 of a second hooking-up member able to cooperate with a first hooking-up member of the audio system 2 avoids any accidental fall of the audio system 2.

The optional presence of a channel 40 allows better removal of heat by the support 4.

The optional presence of cables 44 in the channel 40 gives the possibility of transporting current and/or light between the audio system 2 and a corresponding current and/or light source without interfering with the esthetical aspect of the support.

The invention claimed is:

1. A support for an audio system, the audio system comprising a heat source, a heat discharge surface and a conductor for conducting at least one portion of the heat produced by the heat source towards the discharge surface, wherein the support comprises a plate comprising at least one heat-conducting elastic member able to deform itself in order to fit at least one portion of the discharge surface of the audio system, and a thermal dissipation radiator in thermal contact with the elastic member.

2. The support according to claim 1, wherein said or each elastic member is at least partly made in elastomer.

3. The support according to claim 1 wherein said or each elastic member has a thermal conductivity greater than or equal to 1 W/m/K at 20 ° C.

4. The support according to claim 1, wherein the radiator comprises fins.

5. The support according to claim 1, wherein the plate is movable relatively to the radiator in rotation around at least one axis.

6. The support according to claim 1, wherein the support comprises a hooking-up device intended to cooperate with a complementary hooking-up device of the audio system for securing the audio system to the support.

7. The support according to claim 1, wherein the support delimits at least one channel, the channel opening through a first end in proximity to the or an elastic member and through a second end, opposite to the first end, at a distance from the elastic member for allowing outdoor air to be brought towards the exchange surface.

8. The support according to claim 7, wherein the support comprises a fan capable of forcing the circulation of air in the channel.

9. The support according to claim 7, wherein the support comprises at least one connection cable positioned in the channel and comprising at least one connector.

10. Audio equipment comprises an audio system comprising at least a heat source, a heat discharge surface and a conductor for conducting at least one portion of the heat produced by the heat source towards the discharge surface, the audio equipment further comprises a support according to claim 1, at least one portion of said or each elastic member of the plate being in thermal contact with at least one portion of the discharge surface of the audio system.

11. The audio equipment according to claim 10, wherein the elastic member and the discharge surface form a thermal contact having a thermal resistance advantageously less than 5 K/W.

12. The audio equipment according to claim 10, wherein the plate and the radiator of the support have together a calorific capacity at least equal to half of the sum of the calorific capacity of the discharge surface and of the calorific capacity of the conductor for conducting at least one portion of the heat produced by the heat source towards the discharge surface.

13. The support according to claim 1, wherein said or each elastic member has a thermal conductivity greater than or equal to 3 W/m/K at 20 ° C.

14. The audio equipment according to claim 10, wherein the elastic member and the discharge surface form a thermal contact having a thermal resistance advantageously less than 3 K/W.

15. The audio equipment according to claim 10, wherein the elastic member and the discharge surface form a thermal contact having a thermal resistance advantageously less than 1 K/W.

* * * * *